(No Model.)
H. T. BARTLETT & H. J. HANCOCK.
TURN BUCKLE.
No. 535,314. Patented Mar. 5, 1895.
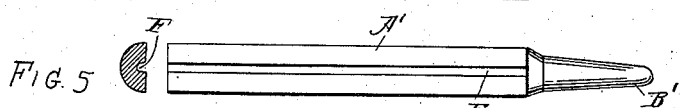
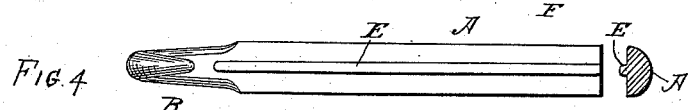
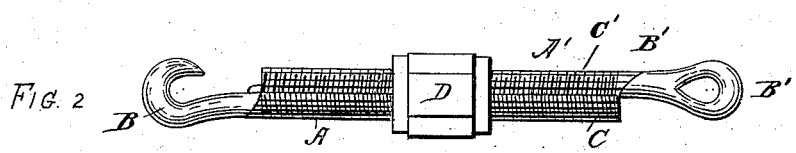
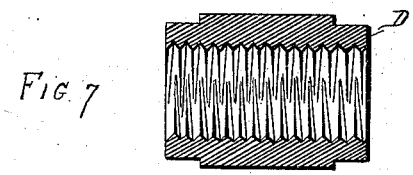
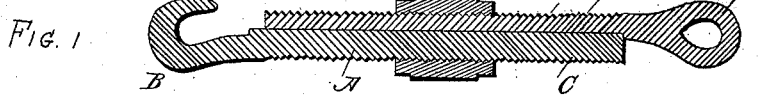
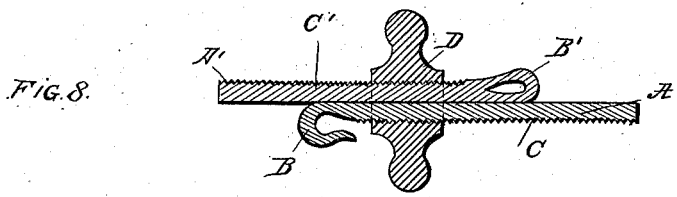
WITNESSES:
John C. Lacey.
A. M. Lublin.
INVENTORS
Henry T. Bartlett and
Henry J. Hancock
BY
Phillips Abbott
ATTORNEY.
THE NORRIS PETERS CO., PHOTO-LITHO., WASHINGTON, D.C.

UNITED STATES PATENT OFFICE.

HENRY T. BARTLETT AND HENRY J. HANCOCK, OF NEW YORK, N. Y.; SAID BARTLETT ASSIGNOR TO JEAN GRANT BARTLETT, OF SAME PLACE.

TURNBUCKLE.

SPECIFICATION forming part of Letters Patent No. 535,314, dated March 5, 1895.

Application filed October 27, 1893. Serial No. 489,326. (No model.)

*To all whom it may concern:*

Be it known that we, HENRY T. BARTLETT and HENRY J. HANCOCK, citizens of the United States, and residents of New York city, in the county of New York and State of New York, have invented certain new and useful Improvements in Turnbuckles, of which the following is a specification.

The object of our invention is, first, to increase the amount of "take up" in turnbuckles of any given length; second, to obtain a more direct application of power; third, to obtain compactness by avoiding the spread or width of turnbuckles of the ordinary construction; fourth, to increase their strength, and, fifth, to improve their appearance.

Our invention, generally stated, consists in making the turnbuckle in two half round parts of substantially equal length. They are threaded on their exterior or half round surfaces, one having a right handed and the other a left handed thread, and they both, when placed with their flat sides together, are passed through a nut which is threaded interiorly with right and left hand threads. The outside of the nut is preferably given an angular form, so that a suitable wrench may be employed to turn it. It may, however, be cylindrical, and turned up with tongs, or it may be made in the form of a hand wheel to be turned by hand. We also sometimes introduce a spline between the two parts, so as to assure true longitudinal movement of one over the other.

In the drawings hereof, Figure 1, illustrates a longitudinal vertical section of the invention. Fig. 2, illustrates an elevation of the invention as shown in Fig. 1. Fig. 3, illustrates an elevation of one half of the turnbuckle, showing the appearance of the half round threaded surface. Fig. 4, illustrates an elevation of the flat side of the part shown in Fig. 3, showing the construction and arrangement of the spline. Fig. 5, illustrates a view of the flat side of the other part of the turnbuckle, showing the longitudinally running groove for the reception of the spline on the other part. Fig. 6, illustrates an elevation of the part shown in Fig. 5, disclosing the appearance of its half round threaded surface. Fig. 7, illustrates a longitudinal sectional view of the nut. Fig. 8, illustrates a section of a somewhat modified construction, showing the nut, as provided with a hand wheel and illustrating the passage of the two parts composing the turnbuckle past each other, whereby a greater "take up" of the turnbuckle is effected.

The two parts of the turnbuckle are, as stated, made half round in cross section.

A represents one part and A' the other. B, B' are the hook and eye, made on the said parts respectively, for the attachment thereto of the rods, ropes or other things, which are to be drawn together or made taut. Any other suitable devices may be substituted.

C, C' are the screw threads cut on the half round or outer surfaces of the parts A, A'. They are right and left handed respectively.

D is the nut. It is threaded interiorly with right and left hand threads, which conform to those on the parts A, A' and is preferably squared on its outside.

E is a longitudinally extending spline, made on one part, and F is a similarly arranged groove made in the other part.

In Fig. 8, we show the parts constructed in such manner that the hook and eye will not interfere with the passage of the opposite part in longitudinal direction. Thus the turnbuckle will have its utmost capacity of "take up" available, without any alteration of the parts. It will be seen however, that when constructed as shown in Fig. 8, the line of pull on the hook and eye is such that the turnbuckle is thrown slightly across it. Sometimes this may be considered a defect. If so the parts should be made as shown in Figs. 1 2, and if so, and the parts are run past each other so that their ends interfere with the hook and eye, one or both, then such ends can be easily sawed or filed off to allow of further screwing up.

In Fig. 8, we show the nut as provided with or made in the form of a threaded hand wheel. This construction is frequently very convenient and useful.

The operation is obvious and does not require description, except to say that inasmuch as the "take up" and "let go" action is equally great on both of the parts A, A', that our turnbuckle manifestly has just twice the capacity of the ordinary single rod form.

It will be obvious to those who are familiar with this art, that modifications may be made in the details of construction and still the essentials of our invention be employed. We therefore do not limit ourselves to the details.

We claim—

1. A turnbuckle made of two half round parts threaded on their half round surfaces, with right and left threads respectively and each having a hook, eye, or like device on one end and a nut threaded to conform to the threads on said parts, substantially as set forth.

2. A turnbuckle made of two half round parts threaded on their half round surfaces with right and left hand threads respectively, each having a hook, eye, or like device, on one end splined together on their flat surfaces and a nut threaded to conform to the threads on said parts, substantially as set forth.

3. A turnbuckle made of two half round parts threaded on their half round surfaces, with right and left hand threads respectively, each part being provided with a hook and eye or like device, located outside of the plane of its flat side, and a nut threaded to conform to the threads on the said parts, substantially as set forth.

4. A turn buckle made of two half round parts, threaded on their half round surfaces with right and left hand threads respectively, and each having a hook and eye, or like device at one end, and a nut in the form of a hand-wheel the hub of which is threaded to conform to the threads on said part, substantially as set forth.

Signed at New York, in the county of New York and State of New York, this 20th day of October, A. D. 1893.

HENRY T. BARTLETT.
HENRY J. HANCOCK.

Witnesses:
JOE W. SWAINE,
JOS. GENNER.